United States Patent
Cherepinsky et al.

(10) Patent No.: US 8,032,269 B2
(45) Date of Patent: Oct. 4, 2011

(54) CONTROL SURFACE FAILURE DETECTION FOR FLY-BY-WIRE AIRCRAFT

(75) Inventors: Igor Cherepinsky, Sandy Hook, CT (US); Joseph T. Driscoll, Cheshire, CT (US); William Douglas Kinkead, Wallingford, CT (US); Leonard M. Wengler, Jr., Terryville, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 978 days.

(21) Appl. No.: 11/947,040

(22) Filed: Nov. 29, 2007

(65) Prior Publication Data

US 2009/0012658 A1      Jan. 8, 2009

Related U.S. Application Data

(60) Provisional application No. 60/938,770, filed on May 18, 2007.

(51) Int. Cl.
*B64C 13/00* (2006.01)
*B64D 45/00* (2006.01)

(52) U.S. Cl. .............. 701/14; 701/31; 340/963
(58) Field of Classification Search .............. 701/14
See application file for complete search history.

(56) References Cited

U.S. PATENT DOCUMENTS

| | | | |
|---|---|---|---|
| 2,713,156 A * | 7/1955 | Guarino ............ 340/946 |
| 3,407,399 A * | 10/1968 | De Long et al. ........ 340/946 |
| 3,502,967 A * | 3/1970 | Bridges et al. .......... 324/226 |
| 3,938,762 A | 2/1976 | Murphy | |
| 4,053,123 A | 10/1977 | Chadwick | |
| 4,345,237 A * | 8/1982 | Lerche et al. ............ 340/946 |
| 4,420,808 A | 12/1983 | Diamond et al. | |
| 4,528,564 A | 7/1985 | Trampnau | |
| 4,529,155 A | 7/1985 | Bramwell et al. | |
| 4,540,141 A | 9/1985 | Durno et al. | |
| 4,648,568 A | 3/1987 | Phillips | |
| 4,759,514 A | 7/1988 | Burkam | |
| 4,934,825 A | 6/1990 | Martin | |
| 5,214,973 A | 6/1993 | Hambric | |
| 5,327,358 A * | 7/1994 | Stubbs ................. 702/36 |
| 5,483,833 A * | 1/1996 | Dickens et al. ............ 73/583 |
| 5,607,122 A | 3/1997 | Hicks et al. | |
| 5,715,162 A * | 2/1998 | Daigle ................... 701/99 |
| 5,749,540 A | 5/1998 | Arlton | |
| 5,806,805 A * | 9/1998 | Elbert et al. ............. 244/195 |
| 5,931,681 A | 8/1999 | Thomassin et al. | |
| 6,036,141 A | 3/2000 | Clay | |
| 6,446,015 B1 * | 9/2002 | Duke ................... 702/66 |
| 6,929,215 B2 | 8/2005 | Arlton | |
| 7,933,691 B2 * | 4/2011 | Pitt et al. ............... 701/3 |
| 2007/0124038 A1 * | 5/2007 | Goupil ................. 701/29 |
| 2007/0173988 A1 * | 7/2007 | Pitt et al. ............... 701/10 |

OTHER PUBLICATIONS

International Search Report for International Application No. PCT/US2008/062831 dated Jun. 17, 2009.

* cited by examiner

*Primary Examiner* — Shelley Chen
(74) *Attorney, Agent, or Firm* — Carlson Gaskey & Olds PC

(57) ABSTRACT

A flight control system which detects a failure of a flight control surface and performs at least one action in response to the detected failure.

25 Claims, 3 Drawing Sheets

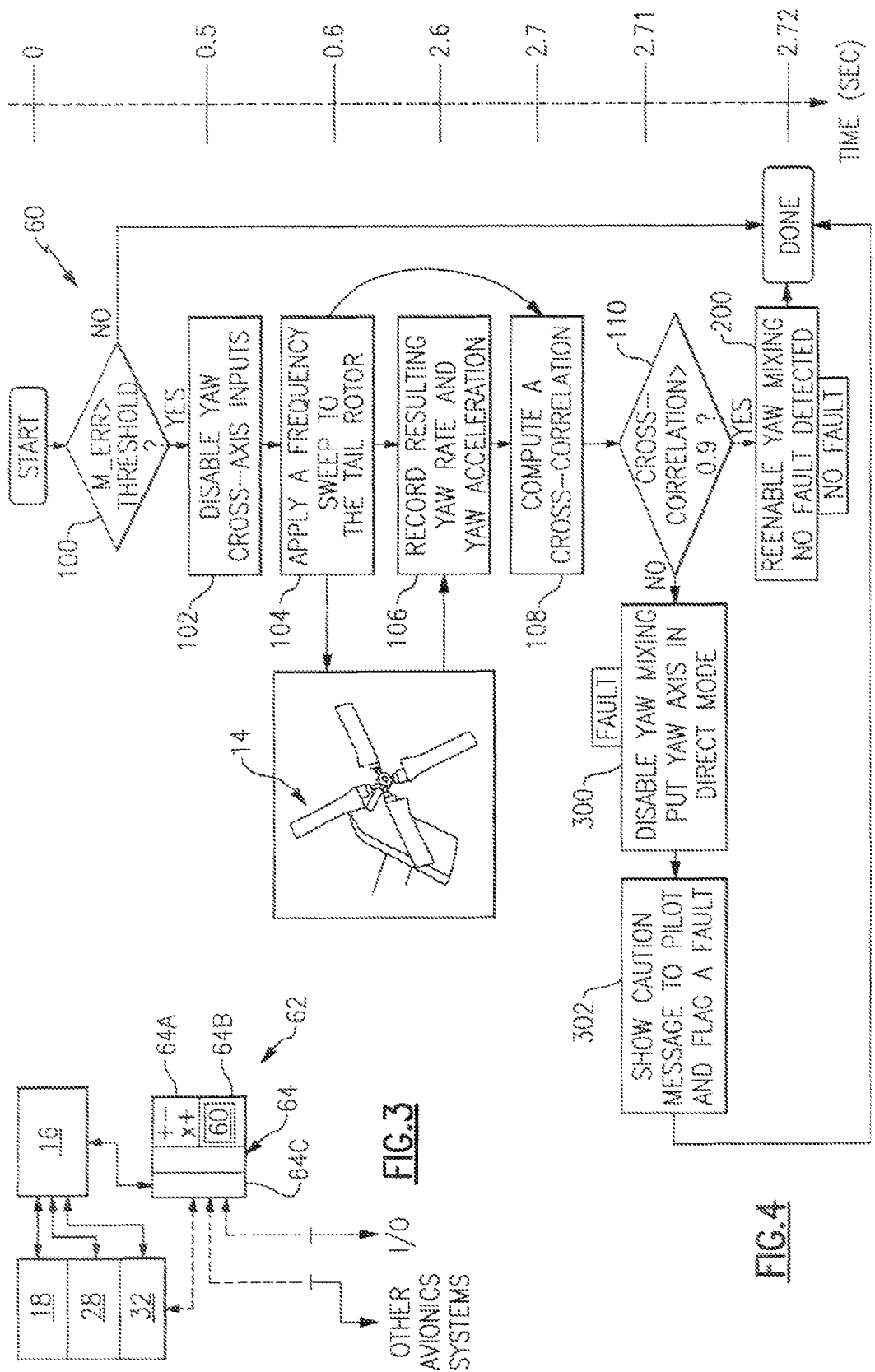

CONTROL SURFACE FAILURE DETECTION FOR FLY-BY-WIRE AIRCRAFT

The present application claims priority to U.S. Provisional Patent Application Ser. No. 60/938,770, filed May 18, 2007.

STATEMENT REGARDING FEDERALLY SPONSORED RESEARCH OR DEVELOPMENT

This invention was made with government support under Contract No.: W58RGZ-06-D-0045 awarded by the Department of the Army. The government therefore has certain rights in this invention.

BACKGROUND OF THE INVENTION

The present invention relates to a fly-by-wire flight control system.

Some fly-by-wire aircraft utilize highly optimized model-following control systems as well as sophisticated electronic mixing. These systems rely on having a correct, real-time mathematical representation of the aircraft available in the flight control system. Small model variations can be accounted for but large variations, such as loss of tail rotor of a rotary-wing aircraft, produce large discrepancies between the flight control system model and the resulting aircraft dynamics. These discrepancies tend to cause difficulties in control of the aircraft after such failures.

In general, there are not many such failures that are survivable in a rotary-wing aircraft—loss of any of the main rotor controls typically results in a complete loss of control. Loss of tail rotor thrust due to loss of the tail rotor drive-shaft or even complete physical loss of the tail rotor, however, can be survivable if the flight control system detects this event and adjusts accordingly.

In mechanically controlled aircraft that are designed to survive such failure events, the burden of detection and control was on the pilot. In a fly-by-wire aircraft, the flight control system must detect such an event and adjust control inputs accordingly; otherwise the aircraft may not be controllable.

Rotary-wing aircraft are typically highly cross coupled and may include a canted tail rotor such that the control mixing algorithm requires the yaw term to feed both pitch and roll axes with a relatively high gain to compensate for the canted tail rotor. During loss of the tail rotor, the aircraft starts to spin and the flight control system responds through application of full yaw input opposite the spin. This typically causes the control mixing algorithm to also apply pitch and roll to compensate for the yaw input, which then results in a relatively large pitch and roll motion of the aircraft since the yaw input did not produce the expected pitch and roll motion response. Such disturbances may further complicate an already difficult loss of tail-rotor event by compounding the yaw motion with pitch and roll motion.

Some aircraft are designed with a very large vertical tail surface such that at cruise speed, the tail rotor needs minimal anti-torque produced thrust. As such, tail rotor failure will not cause a significant change in aircraft behavior unless the conventional fly-by-wire system unintentionally complicates such a disturbance.

SUMMARY OF THE INVENTION

A flight control system according to an exemplary aspect of the present invention includes a module which detects a failure of a flight control surface in response to a frequency sweep of the flight control surface and performs at least one action in response to the detected failure.

A failure detection method for a flight control surface of a fly-by-wire aircraft according to an exemplary aspect of the present invention includes performing a frequency sweep of a flight control surface to cause an acceleration response and a rate response of the flight control surface; computing a cross-correlation using at least the acceleration response and the rate response; detecting a failure of the flight control surface using at least the information from the computed cross-correlation; and performing at least one action in response to the detected fail.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 3 is a block diagram of a module which implements a flight control surface failure detection algorithm; and FIG. 4 is a block diagram of a flight control surface failure detection algorithm.

DETAILED DESCRIPTION OF THE DISCLOSED EMBODIMENT

Figure 1:
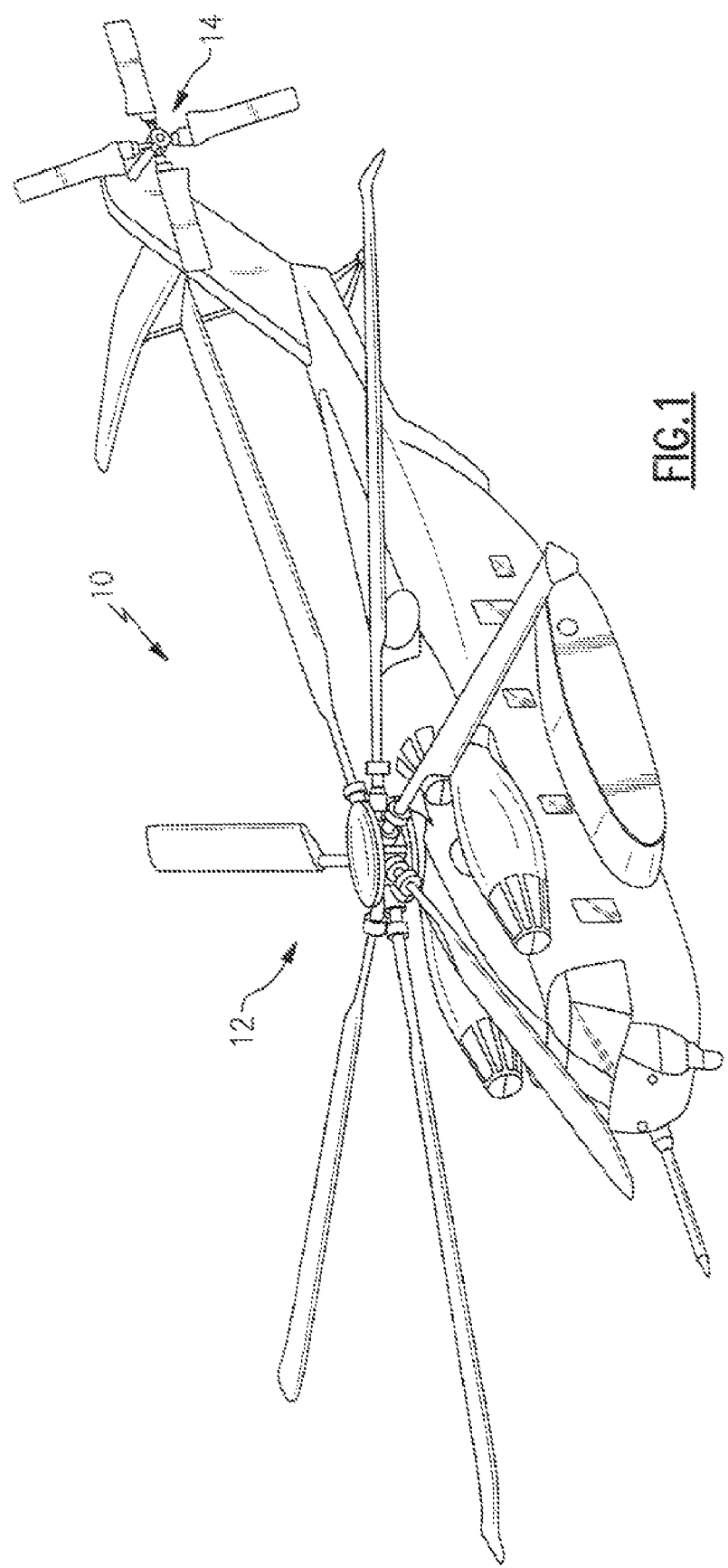
FIG. 1 is a general perspective view of an exemplary rotary wing aircraft for use with the present invention.

FIG. 1 illustrates a general perspective view of an exemplary vertical takeoff and landing (VTOL) rotary-wing aircraft 10 for use with the present invention. The rotary-wing aircraft 10 includes a main rotor assembly 12 and tail rotor assembly 14. Although a particular helicopter configuration is illustrated and described in disclosed embodiments, other configurations and/or machines, such as high speed compound rotary-wing aircraft with supplemental translational thrust systems, dual contra-rotating, coaxial rotor system aircraft, turbo-props, tilt-rotors, tilt-wing aircraft, and fixed-wing aircraft will also benefit from embodiments of the present invention.

Figure 2:
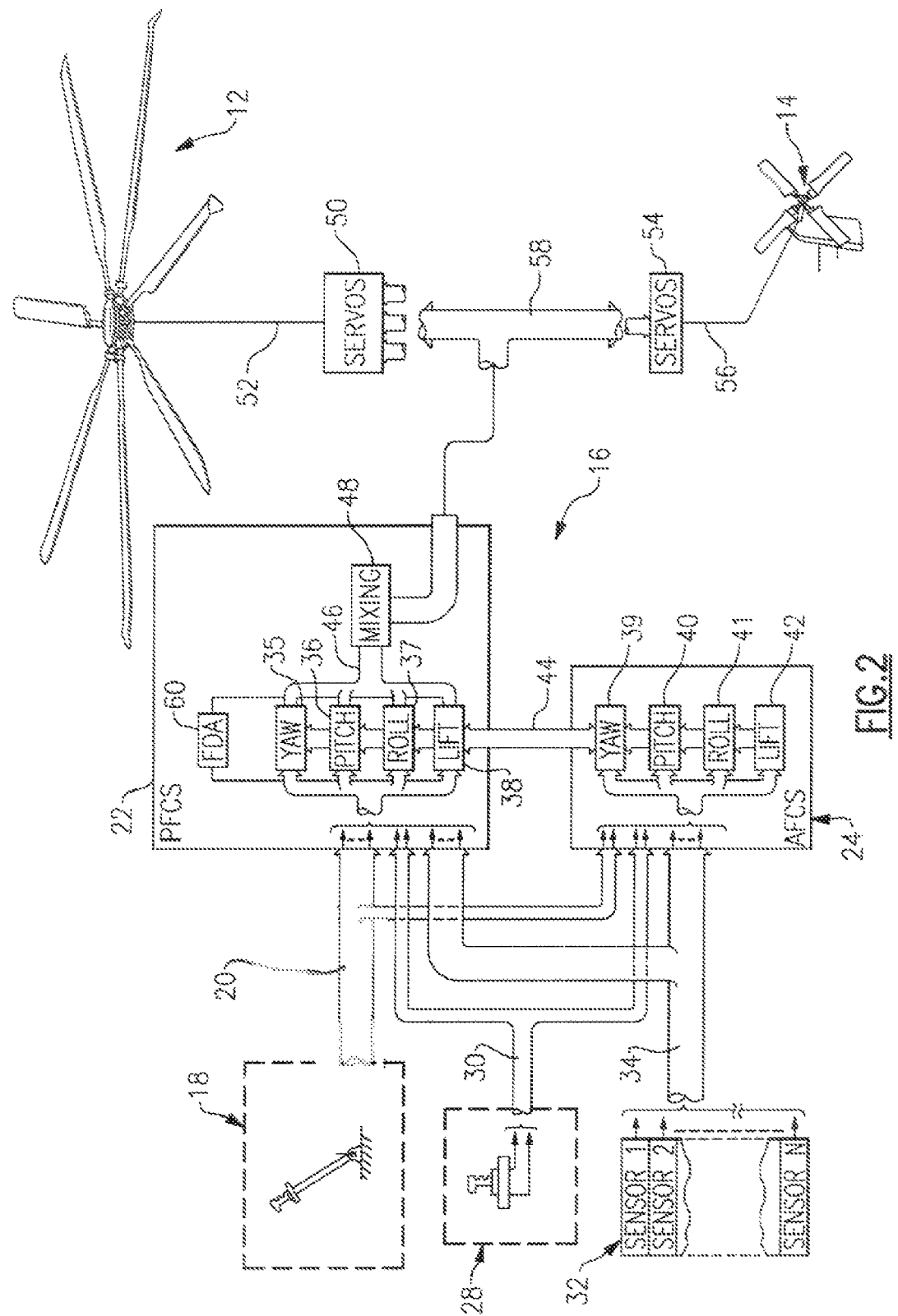
FIG. 2 is a schematic diagram of a model following flight control system.

Referring to FIG. 2, a fly-by-wire type flight control system 16 includes a model following control system which shapes the pilot's controller and displacement commands through an inverse vehicle model to produce the desired aircraft response. The system 16 includes a Primary Flight Control System (PFCS) 22 and an Automatic Flight Augmentation and Cuing System (FACS) 24.

The PFCS 22 is the flight critical portion of the flight control system, while the FACS 24 is the mission critical portion. The FACS 24 augments the performance of the PFCS 22. The PFCS 22 and FACS 24 execute explicit model following control laws to provide both control and stability augmentation. In this control law architecture, pilot commands are shaped directly into desired aircraft responses. These desired commands are then passed through an inverse aircraft model to obtain the control commands required to produce the desired response. The difference between the desired command and the aircraft response is also fed back to drive these errors towards zero, thus improving the model following performance.

The PFCS 22 and FACS 24 each receive the force output command signals of a collective controller 18 on line 20, a cyclic controller 28 on line 30, and the aircraft's sensed parameter signals from sensors 32, on lines 34. The collective controller 18 and the cyclic controller 28 may take various forms including sidearm controllers, a yaw pedal system or other such flight controllers. The pilot command signals on lines 20, 30 and the sensed parameter signals on lines 34 are shown consolidated within trunk lines 32 and 34 in the PFCS and FACS, respectively.

The PFCS 22 and FACS 24 may each contain separate control channel logic laws for controlling the yaw, pitch, roll and lift axes of the aircraft. The logic is included in the PFCS and FACS control modules (schematically represented by blocks 35-38 for the PFCS and blocks 39-42 for the FACS). The sensed parameter signals from aircraft sensors 32, on lines 34, provide the PFCS and FACS with the aircraft's angular rate and attitude response to the rotor command signals. The PFCS logic provides rotor command signals and the FACS logic provides conditioning and/or trimming of the PFCS four axis logic functions. The PFCS and FACS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the tail rotor servos 54 which control the thrust of the tail rotor 14 through linkages 56.

Referring to FIG. 3, a module 62 which performs a flight control surface failure detection algorithm 60 (see also FIG. 4) is schematically illustrated in a block diagram format. The algorithm 60 is the scheme by which the decisions are made in the disclosed non-limiting embodiments. The module 62 utilizes, in an exemplary embodiment, the model-following architecture of the flight control system 16 to implement the flight control failure detection algorithm 60.

The flight control failure detection algorithm 60 may be microprocessor based. In one non-limiting embodiment, the module 62 includes a controller 64, which may be a flight computer, a portion of a central vehicle main control system, an interactive vehicle dynamics module, stand-alone controllers typically implemented as a line-replaceable unit (LRU). The controller 64 typically includes a processor 64A, a memory 64B, and an interface 64C for communicating with the flight control system 16, the collective controller 18, the cyclic controller 28 the sensors 32, and other avionics systems. The memory 64B may, for example only, include RAM, ROM, DVD, CD, a hard drive, or other electronic, optical, magnetic, or any other computer readable medium onto which is stored the data and control algorithms described herein.

Referring to FIG. 4, the flight control surface failure detection algorithm 60 readily detects the loss of tail rotor thrust and reconfigures the fly-by-wire flight control system 16 The flight control surface failure detection algorithm 60 allows the fly-by-wire system 16 to detect and mitigate flight control failures. The flight control surface failure detection algorithm 60 monitors model-following performance of a flight control surface such as the tail rotor 14. It should be understood that although a tail rotor is disclosed in the illustrated non-limiting embodiment, any aircraft flight control surface may be so monitored.

Initially, if the model-following errors exceed a pre-determined threshold (action 100), a pending tail rotor failure is declared. Immediately after the pending tail rotor failure is declared, all yaw cross-axis mixing inputs (such as coupled pitch and collective mixing) are disabled (action 102). This prevents an immediate aircraft response due to yaw/pitch and yaw/roll mixing terms should the tail rotor actually be disabled. The tail rotor is considered operable when the tail rotor will respond at least partially to inputs. {Modify that sentence appropriately. This attempts to define "operable" as a partial response to any input.}

The next task for the flight control surface failure detection algorithm 60 is to determine if a tail rotor failure actually exists. This is achieved by application of a very small frequency sweep to the tail rotor 14 through the tail rotor servos 54 (action 104) the frequency sweep may be a sine wave input to the tail rotor 14 in which the frequency thereof varies with time, such as two (2) Hertz (Hz) to four (4) Hz over a duration of two (2) seconds—also often referred to as a "chirp". In an exemplary embodiment, the frequency sweep is of very small amplitude such that pilots may not even perceive the yaw response but provides enough input to cause yaw acceleration and yaw rate detectable by the flight control surface failure detection algorithm 60 to reflect the sweep (if the tail rotor is still providing thrust).

The flight control surface failure detection algorithm 60 records these parameters (e.g., yaw acceleration and yaw rate) as the sweep is being applied (action 106). After completion of the sweep, a cross-correlation is computed between the sweep (e.g., the input and known signal) and the recorded yaw rate and yaw acceleration (e.g., the output and determined signal) (action 108). In signal processing, cross-correlation (or sometimes "cross-covariance") is a measure of similarity of two signals, commonly used to find features in an unknown signal by comparing the unknown signal to a known one. The cross-correlation is then determined to be either "high" or "low" through comparison to some value (action 110).

If the correlation is high—for example only, greater than 90 percent in one non-limiting embodiment—the aircraft responded to the sweep and no tail rotor failure exists such that all yaw cross-axis mixing terms are again enabled (action 200).

If the correlation is low—for example only, less than 90 percent in one non-limiting embodiment—a tail rotor failure exists such that all yaw mixing to other axes is disabled, the yaw channel is put into direct mode (action 300) and a caution message is displayed (action 302). Disabling all yaw mixing to other axes and placing the yaw channel into direct mode facilitates autorotation entry and alerts the aircrew well before they may otherwise be capable of reaction to a tail rotor failure. It is noted that the times shown on FIG. 3 are merely exemplary.

This algorithm can also be applied to other control surfaces on rotorcraft and fixed-wing aircraft to detect and mitigate control surface failures. This algorithm can be applied to a broad range of aircraft—its immediate use is on rotorcraft that have highly coupled tail rotor systems.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular action sequences are shown, described, and claimed, it should be understood that actions may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fly-by-wire flight control system comprising:
a module which detects a failure of a flight control surface in response to a frequency sweep of the flight control surface and performs at least one action in response to said detected failure, wherein said failure is detected using at least a cross-correlation computed from at least a response of the flight control surface.

2. The system as recited in claim 1, wherein said frequency sweep provides an input to the flight control surface to cause an acceleration response of the flight control surface that should be detectable if the flight control surface is operable.

3. The system as recited in claim 1, wherein said flight control surface includes a tail rotor.

4. The system as recited in claim 1, wherein said frequency sweep provides an input to the flight control surface to cause a yaw rate response of the flight control surface that should be detectable if the flight control surface is operable.

5. The system as recited in claim 1, wherein said at least one action includes disabling a cross-axis mixing term.

6. A failure detection method for a flight control surface of a fly-by-wire aircraft comprising:
performing a frequency sweep of a flight control surface to cause an acceleration response and a rate response of the flight control surface;
computing a cross-correlation using at least the acceleration response and the rate response;
detecting a failure of the flight control surface using at least the information from the computed cross-correlation; and
performing at least one action in response to the detected failure.

7. A method as recited in claim 6, wherein performing a frequency sweep comprises generating an input signal to the flight control surface to cause the acceleration response and the detectable rate response of the flight control surface that should be detectable if the flight control surface is operable.

8. A method as recited in claim 6, wherein performing a frequency sweep comprises generating an input to the flight control surface that is undetectable by a pilot operating the aircraft.

9. A method as recited in claim 6, wherein performing a frequency sweep comprises generating a yaw input to cause a yaw acceleration response and a yaw rate response of the flight control surface that should be detectable if the flight control surface is operable.

10. A method as recited in claim 6, further comprising disabling a flight control cross-axis mixing term in response to a value of the cross-correlation being within a predetermined range.

11. A method as recited in claim 6, further comprising, prior to performing the frequency sweep:
determining whether a model-following error exceeds a pre-determined threshold;
declaring a pending flight control surface failure in response to a determination the model-following error exceeds the pre-determined threshold; and
limiting a cross-axis mixing term.

12. A method as recited in claim 11, further comprising disabling a flight control cross-axis mixing term in response to a value of the cross-correlation being within a predetermined range.

13. A method as recited in claim 12, wherein performing at least one action further comprises displaying a caution message.

14. A method as recited in claim 11, further comprising reenabling the cross-axis mixing term in response to a value of the cross-correlation being outside the predetermined range.

15. A method as recited in claim 14, wherein the predetermine range is zero to 0.9.

16. A method as recited in claim 11, further comprising disabling a yaw/pitch cross-axis mixing term and a yaw/roll cross-axis mixing term in response to a value of the cross-correlation being within a predetermined range.

17. A method as recited in claim 16, wherein performing at least one action further comprises displaying a caution message.

18. A method as recited in claim 11, further comprising reenabling a yaw cross-axis mixing term in response to a value of the cross-correlation being outside the predetermined range.

19. A method as recited in claim 11, further comprising disabling all yaw cross-axis mixing.

20. A method as recited in claim 19, further comprising placing a yaw channel into a direct mode.

21. A method as in claim 6, wherein performing a frequency sweep comprises applying an input signal having a frequency and an amplitude to the flight control surface.

22. An aircraft comprising:
a flight control surface;
a fly-by-wire flight control system in communication with said flight control surface; and
a module in communication with said fly-by-wire flight control system, said module operable to detect a failure of said flight control surface in response to a frequency sweep of the flight control surface and perform at least one action in response to said detected failure, wherein said failure is detected using at least a cross-correlation computed from at least a response of the flight control surface.

23. The aircraft as recited in claim 22, wherein said frequency sweep is undetectable by a pilot.

24. The aircraft as recited in claim 22, wherein said at least one action includes disabling a cross-axis mixing term.

25. The aircraft as recited in claim 22, wherein said at least one action includes displaying an alert.

* * * * *